United States Patent

[11] 3,589,540

| | | |
|---|---|---|
| [72] | Inventor | John Kinross<br>Leighton Buzzard, England |
| [21] | Appl. No. | 819,194 |
| [22] | Filed | Apr. 25, 1969 |
| [45] | Patented | June 29, 1971 |
| [73] | Assignee | Lancer Boss Limited<br>Leighton Buzzard, England |
| [32] | Priority | May 13, 1968 |
| [33] | | Great Britain |
| [31] | | 226 29-68 |

[54] FORKLIFT ATTACHMENTS
4 Claims, 3 Drawing Figs.

[52] U.S. Cl. .................................................. 214/621,
214/75, 214/730, 294/67
[51] Int. Cl. ................................................... B66f 9/14
[50] Field of Search............................................ 214/620,
621, 652, 658, 75, 38.46; 294/67.2, 67.2 A, 67.2
B, 67.2 C, 67.4 A, 67.4, 67.4 B, 67.4 C, 67;
214/730, 731

[56] References Cited
UNITED STATES PATENTS

| 2,696,317 | 12/1954 | Toffolon........................ | 214/620 |
| 2,699,879 | 1/1955 | Bertram ....................... | 274/67 (.2C) X |
| 3,086,661 | 4/1963 | De Stasi........................ | 294/67 (.4B) X |
| 3,161,309 | 12/1964 | Baudhuin et al.............. | 274/67 (.2C) X |
| 3,176,866 | 4/1965 | Meister, Jr.................... | 214/620 |
| 3,243,224 | 3/1966 | Gutridge ....................... | 294/67 (.2C) |
| 3,251,496 | 5/1966 | Lamer et al................... | 274/67 (.2C) X |
| 3,438,523 | 4/1969 | Vik................................ | 214/620 X |
| 3,448,874 | 6/1969 | Martinson .................... | 214/75 |
| 3,490,622 | 1/1970 | Brackin......................... | 214/75 X |

*Primary Examiner*—Gerald M. Forlenza
*Assistant Examiner*—Robert J. Spar
*Attorney*—Imirie, Smiley, Snyder & Butrum

ABSTRACT: An attachment for use with a power-operated load-lifting attachment of the forklift type, comprising a frame engageable by the forks and having downwardly extending arms movable with respect to this frame to engage the load from below, power-operated means to adjust the frame on the forks and to adjust the arms to engage the load.

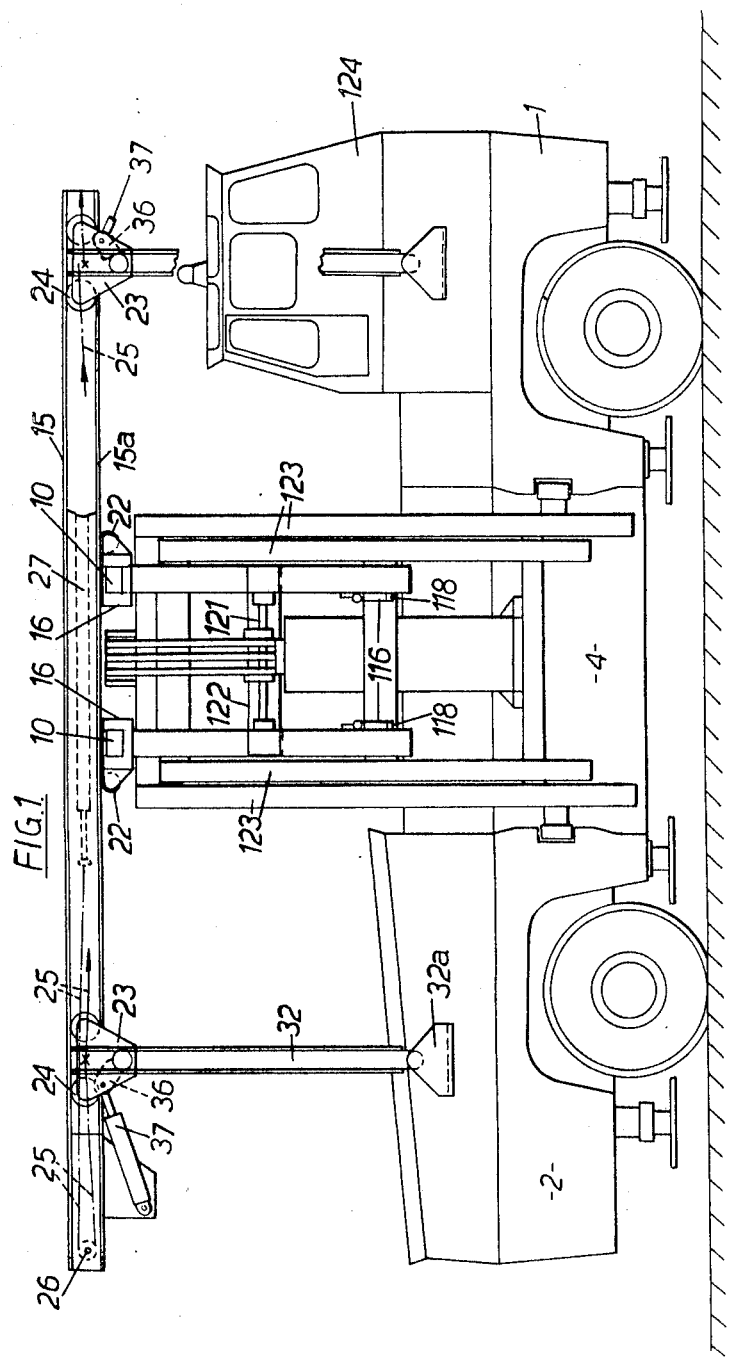

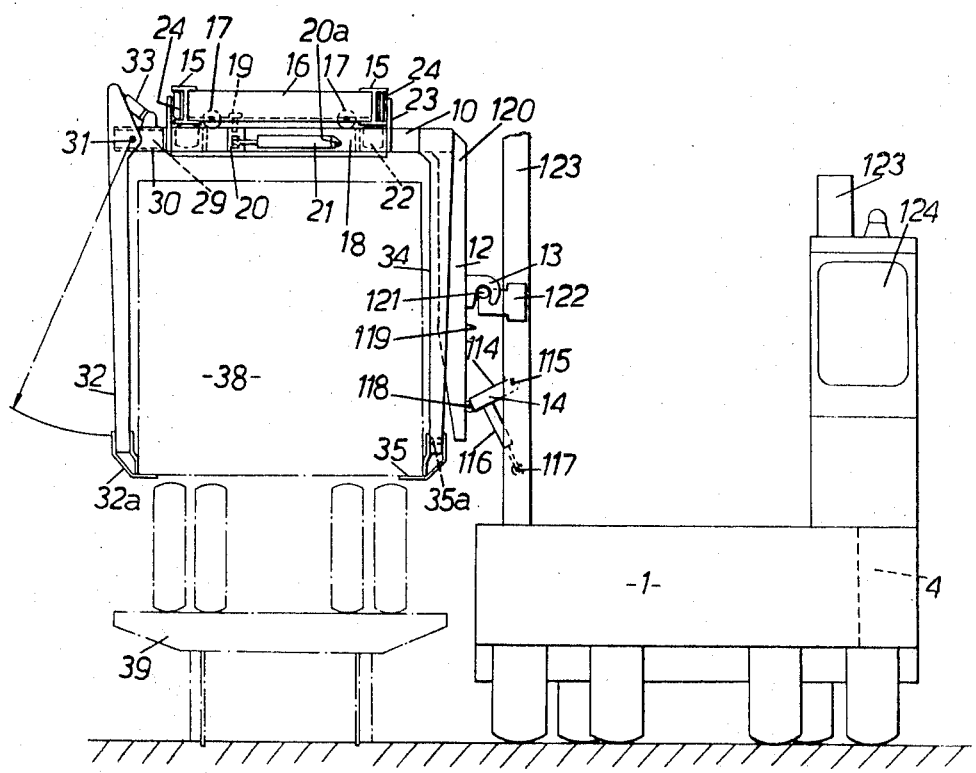

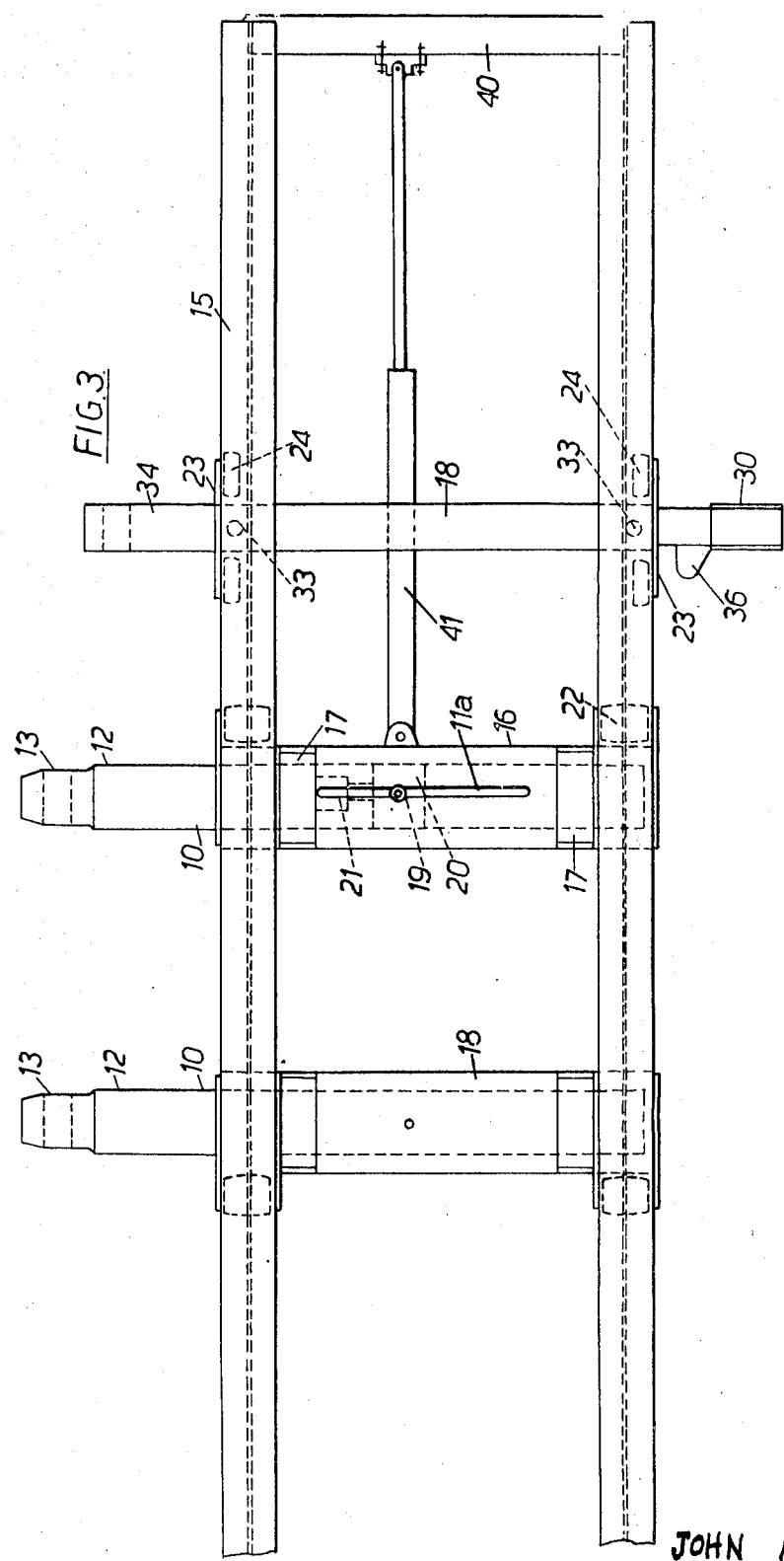

3,589,540

FORKLIFT ATTACHMENTS

BACKGROUND OF THE INVENTION

Field of the Invention

This invention relates to attachments for forklift trucks and the like including side loader vehicles. Side loader vehicles have the front and rear body portions each supported on road wheels and interconnected by a backbone structure at one side of the vehicle leaving a transverse recess in the vehicle in which a forklift mast can be traversed transversely. The mast has a power-operated rising and falling carriage thereon which supports forks for engaging beneath a load: the forks may be inverted for engaging a load from above or a pickup point on the load which is above the bottom of the load.

Increasing heavy loads such as complete and truck bodies fully loaded are carried on railway trucks and then transferred to road vehicles for the final stage of their journey. Also it is becoming a recognized procedure of rolling heavy road vehicles lengthwise out and along flat railway trucks to transport them by rail over long distances particularly at high speeds. The disadvantage of such procedures is the weight and bulk size of the loads which makes it difficult to lift them onto the railway trucks and it takes time to roll them on and off the train from one end, i.e. what is known as circus loading which is slow and it is not possible to unload more than one load at a time and vice versa.

The main object of the present invention is to provide an attachment for use with forklift vehicles including side loaders whereby such heavy loads can be lifted as a unit and moved from one side to another such as from a railway wagon to the ground or vice versa.

SUMMARY

According to the present invention an attachment for use with a power-operated lifting apparatus employing forks or like load-engaging means, comprises frame shaped to be engaged by the forks of lifting and lowering them, downwardly extending load-engaging arms secured to the frame and movable with respect thereto to be located downwardly over the load and engage the underside thereof, and power operated means operatable to adjust the frame and/or the arms with respect to the lifting apparatus for accurately engaging the load and supporting it in a raised position. In a preferred construction the arms on the side of the frame remote from the lifting apparatus such as a side loader truck, are pivoted to the frame and can swing about a horizontal axis parallel to and/or perpendicular to the longitudinal axis of the lifting apparatus. The power-operated means is preferably electric such as electric motors powered from the vehicle or hydraulic such as rams, controlled from the driver's cab.

BRIEF DESCRIPTION OF THE DRAWINGS

FIG. 1 is a side view of a side loader vehicle of conventional construction having forks carried on the mast carriage, with the attachment of the invention in the operative position thereon;

FIG. 2 is an end view of the vehicle looking from the right of FIG. 1, showing how the vehicle is used to load a large load-carrying road vehicle onto the railway trucks; and, FIG. 3 is a plan of the frame of the attachment of FIGS. 1 and 2.

DESCRIPTION OF THE PREFERRED EMBODIMENT

In the drawings the same references are used to designate the same or similar parts. The drawings show the attachment in use with a side loader vehicle, but it may be used with a fork lift truck if desired. The vehicle shown has a front body portion 1 with its driver's cab 2 supported on the front road wheels 3 and connected by a backbone structure 4 to a rear body part 5 on its road wheels 6 and having the vehicle prime mover 7 such as a diesel engine. The backbone structure 4 is at one side of the vehicle leaving a recess extending transversely thereof in which a mast 8 of a forklift arrangement of conventional construction can be traversed by power-operated means. The mast has a carriage 122 for the forks 10 which is raised and lowered by power-operated means of conventional construction which form no part of this invention and require no further explanation here. In the drawings the forks 10 are mounted upside down, i.e. the horizontal arms 11 extend from the upper ends of the uprights 12 which are secured by hook 13 to the carriage (not shown) while power-operated tilting means 14 are provided to tilt the forks; the means 14 comprises at each side of the mast an arm 114 pivoted at 115 to the mast and raisable and lowerable by an hydraulic ram indicated at 116 the piston or cylinder of which is pivoted to the mast at 117. The outer end of the arm 114 carries a freely rotatable roller 118 which engages the vertical face 119 of the vertical part 120 of the forks 12. The forks being hung by the hooks 13 on a crossbar 121 on the carriage 122, can be raised and lowered on the mast 123 by operation of conventional forklift carriage raising means (not shown). Since the hooks 13 are midheight of the fork parts 120 of the lower portion of the forks, especially when carrying a load, tends to move in towards the vehicle and hence the roller 118 and face 119 are kept in permanent contact. As the carriage 122 is raised and lowered the roller 118 rolls on the surface 119 and by actuating the ram 116 the load can be tilted in the vertical place about the cross bar 121. The ram is preferably double acting.

The attachment has a main frame formed of two longitudinal beams, shown as I-beams 15, spaced apart and secured together by transoms 16 having horizontal rollers 17 rolling on the top of fork arm receiving sections 18. Each section 18 has an opening in it to receive a pin 19 engaged in a hole in fork 10 and a slot 11a in the transom 16, and this pin enters a block 20 movable within the section 18 by an hydraulic cylinder 21 fixed at 20a to the section 18 and controlled from the driver's cab.

Each section 18 also has rollers 22 journaled therein and engaging the under surface of the bottom flange of the I-beams 15 and an hydraulic cylinder 41 is mounted between tie 40 and transom 16 to move the frame longitudinally of the vehicle along the sections 18.

Spaced along the frame from the sections 18 are pairs of bogies 23 having rollers 24 running within the flanges 15a of the I-beams 15 and cables 25 running over pulleys 26 are provided to move the bogies in unison in opposite directions. These bogies are moved by a double acting hydraulic cylinder, a cylinder 27 connected with bogies by the cable 25 whereby movement of one pair of bogies in one direction will cause movement of the other pair of bogies in the opposite direction.

Each bogie supports a sleeve 29 twistable thereon about a horizontal pivot in the form of a tube 30, the sleeve having pivoted thereto at 31 a downwardly extending arm 32 the lower end of which has pivoted to it a load engaging member 32a. The arm 32 is movable about its pivot 31 by an hydraulic cylinder-rod arrangement 33 to enable the arm to be swung outwardly for lowering onto the load and moved to locate the foot of the member 32a in engagement with the load as seen in FIG. 2. At the opposite side of the load a comparable arm 34 is fixed with a lower foot 35 pivotable about a pin 35a.

The sleeve 29 has a bracket 36 fixed on it and this is pivotally connected to the rod of an hydraulic cylinder 37 by which the arm can be swung forwardly and backwardly along the vehicle to facilitate engagement of the arms with the load as will be explained.

The arrangement of the bogies 23 and the means for moving them along the beams 15 may be additional to or an alternative to the cylinder 41, in the latter case the tubes 30 being on transoms extending across the frame.

The load is shown to be a road vehicle 38 which has been loaded onto a railway wagon 39, or is about to be removed therefrom by using the attachment of this invention.

In operation the side loader vehicle is brought alongside the road by the driver with the mast fully retracted in the vehicle recess so that the forks hold the attachment over the deck of the side loader vehicle. The fork carriage is then raised to bring the forks 10 above the load so that arms 32, suitably raised and/or swung outwardly by the respective hydraulic cylinders, can be located on the far side of the load from the vehicle and then by the cylinders they are brought into close proximity to the load so that the feet 32a, 35 can be engaged beneath the load which can then be raised by elevating the forks and carriage on the mast. The mast with load raised sufficiently high can be retracted into its recess if desired while the side loader vehicle is driven to the location where the load is deposited on the ground or other support such as a railway truck 39.

Preferably a quickly interchangeable carriage 122 can be provided so that the unloaded mast can be quickly converted to using forks the right way up, i.e. the reverse of their positions in the drawings, for lifting loads from underneath in the conventional way.

By means of the attachment of the invention the cylinders 21 may be disconnected from the source of pressure fluid and thus able to float so that as the attachment is lowered over the load it can freely move to the right or left in FIG. 2 to locate itself astraddle the load. By the cylinder 41 as the load is lifted it can be curved longitudinally of the side loader vehicle so that it is dynamically balanced on the mast, which is useful if the loader is heavier one end than the other. Also if the vehicle is not located exactly parallel to the load, the cylinders 21 can be actuated, or only one of them leaving the other free, or in opposite directions, to ensure the arms 32, 34 straddle the load: in this event when the load is lifted the cylinders can be actuated to bring the load parallel to the vehicle as or before the mast is withdrawn with the load into the vehicle recess.

We claim:

1. An attachment for use in lifting container loads with a power-operated lifting apparatus employing fork load raising means supported on a carriage movable along a vertically extending mast, said attachment comprising:

a frame having spaced longitudinal members for disposition horizontally over a load container;

hollow transoms secured to the longitudinal members, said transoms being shaped to receive horizontal arms of said fork means;

rollers on said transoms to engage said fork means in said transoms to facilitate translation of said transoms along said fork means;

power-operated means to effect said translational movements, said frame having a shape to provide at spaced positions in its length on opposite sides thereof means to embrace a container load;

said embracing means each comprising a downwardly extending elongated load-engaging arm;

a load-engaging member extending inwardly from the lower end of said arm, whereby said arm and said load engaging member extend from the frame downwardly over the full height of the container and engage under the container respectively;

said arms on at least one side of said frame being pivotable about a horizontal axis to engage over and be brought into engagement with the container;

power-operated means operable to pivot said arms; and separate power-operated means operable to adjust the relative position of at least one of said frame and said arms to said lifting apparatus for accurately engaging said load and supporting said load in a raised position.

2. An attachment according to claim 1, wherein the load-carrying arms are pivotally mounted with respect to longitudinal frame members of the attachment to swing in two mutually perpendicular directions with respect to the frame members, power-operated means being provided to effect either or both of said swinging movements.

3. An attachment according to claim 2, wherein the arms are pivotally connected by horizontal pivots to rotary members rotatably mounted on the frame.

4. An attachment according to claim 1, wherein the longitudinal frame members have horizontally extending tracks along which wheeled bogies can roll, each bogie pivotally supported a load-carrying arm, and the bogies on each longitudinal frame member being interconnected and power operated to be moved in opposite directions.